W. GARNER.
TOOL FOR BORING ELLIPTICAL AND CIRCULAR HOLES.
APPLICATION FILED NOV. 7, 1908.
1,004,409.  Patented Sept. 26, 1911.
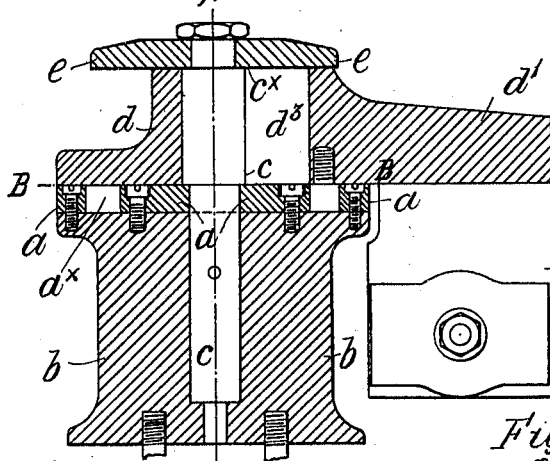
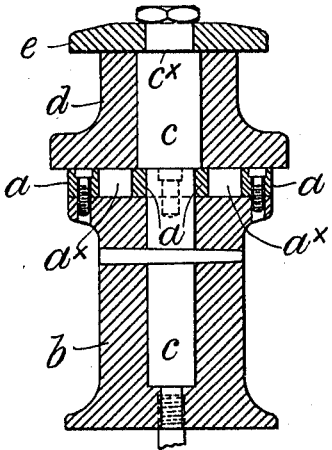
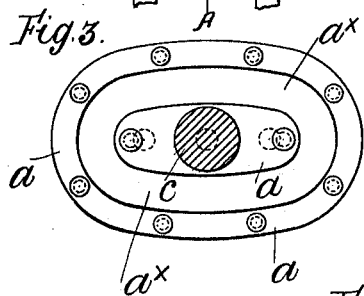
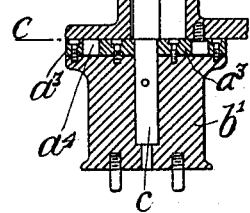
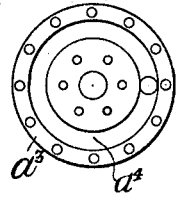
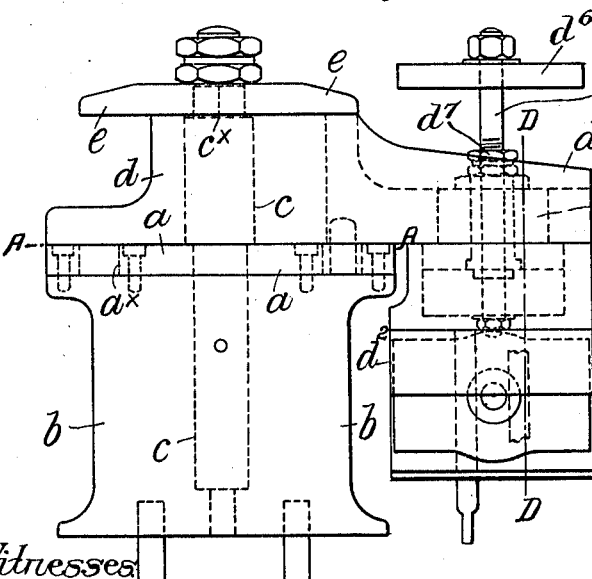
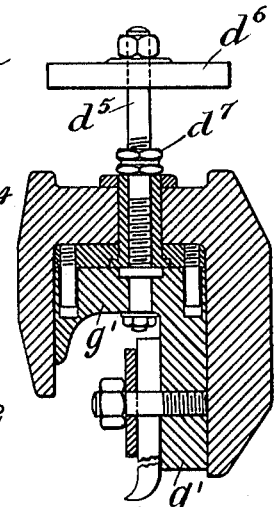
Witnesses
Inventor:—
William Garner
by his Attorneys
Howson & Howson

UNITED STATES PATENT OFFICE.

WILLIAM GARNER, OF PENDLETON, ENGLAND.

TOOL FOR BORING ELLIPTICAL AND CIRCULAR HOLES.

1,004,409.  Specification of Letters Patent.  Patented Sept. 26, 1911.

Application filed November 7, 1908. Serial No. 461,576.

*To all whom it may concern:*

Be it known that I, WILLIAM GARNER, of Perseverance Boiler Works, Cobden street, Pendleton, in the county of Lancaster, England, have invented a new or Improved Tool for Boring Elliptical and Circular Holes, of which the following is a specification.

This invention relates to improved means primarily for boring or cutting elliptical or oval and circular holes in metallic plates, either plain or dished, with the object of lessening the cost of production and increasing the output.

In the accompanying drawings illustrating my said invention and to which I hereinafter refer, Figure 1, is a sectional side elevation, Fig. 2 is a sectional end elevation on center line A A of Fig. 1, and Fig. 3 a plan on line B B of Fig. 1 of my improved tool for boring or cutting elliptical or oval holes; Fig. 4 is a like section as Fig. 1, and Fig. 5 a plan on line C C of Fig. 4 for boring or cutting circular holes in metallic plates: Fig. 6 is a side elevation of a modification of my invention and Fig. 7 is a transverse section on line D D Fig. 6. In these views the same letters refer to like parts.

According to my said invention and for the purpose herein before named, I provide a plate as $a$ with a cam groove such as $a^x$ formed therein on a curve similar in outline to that of the hole that is required to be cut in the plates operated on. I secure the plate $a$ to a block $b$ fastened at its base to the plate in which the hole is required to be cut and which is mounted on the table or bench of a drilling machine or on a lathe face plate. Mounted on said block is a revoluble arm $d'$ movably held in place by a pin $c$ having a head formed by a nut. The arm $d'$ extends from a boss $d$, in which is formed a radial slot $d^3$ for the pin $c$. This arm is of such length that the flange $d^2$, which projects downward from its free end and to which the cutting tool is fixed, can pass around the block $b$ and the cam plate $a$ fixed thereto. Said arm $d'$ has free rotary movement on the pin $c$, which passes through the slot $d^3$ in the boss $d$ as noted, so that the end of the arm and consequently the tool carried thereby are caused to follow a path simliar in form to that of the cam groove $a^x$. The upper end of the pin $c$ is threaded and is formed with a shoulder $c^x$ on which rests a plate $e$ covering the hole $d^3$; the arm $d'$ with the tool and its holder $g$ being thereby retained in position, though free to rotate under the action of a driver fitted on the spindle of the drilling machine or lathe face plate. By these means a cutting tool adjustably fixed to the aforesaid flange $d^2$ of the tool holder $g$, may be caused to cut or bore a hole in the plate corresponding in form to that of the groove in the cam plate.

As shown in Figs. 4 and 5 my device may be used for cutting circular holes in plates, for which purpose the cam groove is given a circular form as indicated at $a^4$ and the cam plate in such case is disk shaped, being preferably mounted on a generally cylindrical block $b'$.

If it be desired to cut holes of various sizes by the use of a single cam plate, the tool holding member may be given the form shown at $g'$ in Figs. 6 and 7 and made to slide on the arm $d'$ to vary its distance from the pin $c$. For this purpose said arm is provided with a radial slot indicated at $d^4$ through which extends a bolt $d^5$ having a cross bar or handle $d^6$ at its upper end and connected at its lower end to the tool-carrying member $g'$. It may be held in any desired position by nuts $d^7$.

I claim;—

1. The combination of a supporting block having a headed pin; a tool-carrying arm mounted between the head of the pin and the block so as to be radially movable and having an elongated slot for the reception of the pin; a grooved plate supported by the block; and means carried by the arm for engaging said groove whereby the tool carried by the arm is caused to follow a path similar in outline to that of the groove.

2. The combination of a block having a bearing pin; an arm radially slotted to receive said pin and free to turn about it as an axis; a plate having a cam groove; a projection on the arm entering said groove for imparting radial movement to said arm; a slidable tool holder on the arm to one side and independent of the projection; and means for permitting adjustment of said holder on the arm toward and from its axis of revolution to vary the size of the piece cut out by said tool.

3. The combination of a block; a pin mounted therein; a plate carried by the pin; a tool-carrying arm having an elongated slot for the reception of the pin and movable radially thereof between said plate and the block; a second plate mounted between the arm and the block and provided with a cam groove, with a member mounted on the arm and fitting said groove for imparting radial movement to the arm.

In testimony whereof I have signed my name to this specification, in the presence of two subscribing witnesses.

WILLIAM GARNER.

Witnesses:
 THOMAS PRESCOTT,
 HAROLD WALKER.

Copies of this patent may be obtained for five cents each, by addressing the "Commissioner of Patents, Washington, D. C."